US008418722B2

(12) United States Patent
Grancher

(10) Patent No.: US 8,418,722 B2
(45) Date of Patent: Apr. 16, 2013

(54) PRESSURE-REGULATOR SERVOVALVE WITH REDUCED LEAKAGE RATE

(75) Inventor: Raymond Grancher, Lailly en Val (FR)

(73) Assignee: IN-LHC, Chateaudun (FR)

( * ) Notice: Subject to any disclaimer, the term of this patent is extended or adjusted under 35 U.S.C. 154(b) by 1355 days.

(21) Appl. No.: 11/187,999

(22) Filed: Jul. 25, 2005

(65) Prior Publication Data
US 2006/0021663 A1     Feb. 2, 2006

(30) Foreign Application Priority Data

Jul. 27, 2004 (FR) ...................................... 04 08277

(51) Int. Cl.
*F15B 13/043* (2006.01)
(52) U.S. Cl.
USPC ............ 137/625.61; 137/625.63; 137/625.64; 137/625.66
(58) Field of Classification Search ......... 137/625.61–625.64, 625.66
See application file for complete search history.

(56) References Cited

U.S. PATENT DOCUMENTS

| | | | | |
|---|---|---|---|---|
| 3,023,782 A | * | 3/1962 | Chaves, Jr. et al. ............. | 137/85 |
| 3,237,641 A | * | 3/1966 | Audemar ................. | 137/596.15 |
| 3,447,555 A | * | 6/1969 | Jenney ...................... | 137/625.62 |
| 3,599,673 A | * | 8/1971 | Lucien ...................... | 137/625.61 |
| 4,145,957 A | * | 3/1979 | McClocklin .............. | 137/625.66 |
| 4,193,425 A | * | 3/1980 | de la Bouillerie ........ | 137/625.61 |
| 4,227,443 A | * | 10/1980 | Toot .......................... | 137/625.64 |
| 4,378,031 A | * | 3/1983 | Nicholson et al. ........ | 137/625.63 |
| 4,785,849 A | | 11/1988 | Masuda | |
| 4,922,964 A | * | 5/1990 | Buscher ................... | 137/625.62 |
| 5,128,908 A | * | 7/1992 | Reust ........................ | 137/625.64 |
| 5,186,213 A | * | 2/1993 | Urata et al. .............. | 137/625.61 |
| 5,381,817 A | | 1/1995 | Gassman et al. | |
| 5,553,827 A | * | 9/1996 | Perkey ...................... | 137/625.63 |
| 6,382,248 B1 | | 5/2002 | Long et al. | |
| 6,640,833 B2 | * | 11/2003 | Brocard et al. .......... | 137/625.63 |
| 6,786,236 B2 | * | 9/2004 | Jansen ...................... | 137/625.64 |

FOREIGN PATENT DOCUMENTS

DE    37 39 824 A1    6/1989
WO    WO 97/43154 A    11/1997

* cited by examiner

*Primary Examiner* — Craig Schneider
(74) *Attorney, Agent, or Firm* — Sughrue Mion, PLLC

(57) ABSTRACT

The invention relates to a pressure-regulator servo-valve comprising a body having a utilization port, a pressure feed port, and a return port, a distributor spool movably mounted in the body to put the utilization port into communication either with the feed port or with the return port, the spool co-operating with the body to define at least one pilot chamber connected to a nozzle that is arranged to open out into a cavity connected to the return port, a vane extending in the cavity facing the nozzle and being mounted to be moved in controlled manner. According to the invention, the pilot chamber is connected to the utilization port.

3 Claims, 1 Drawing Sheet

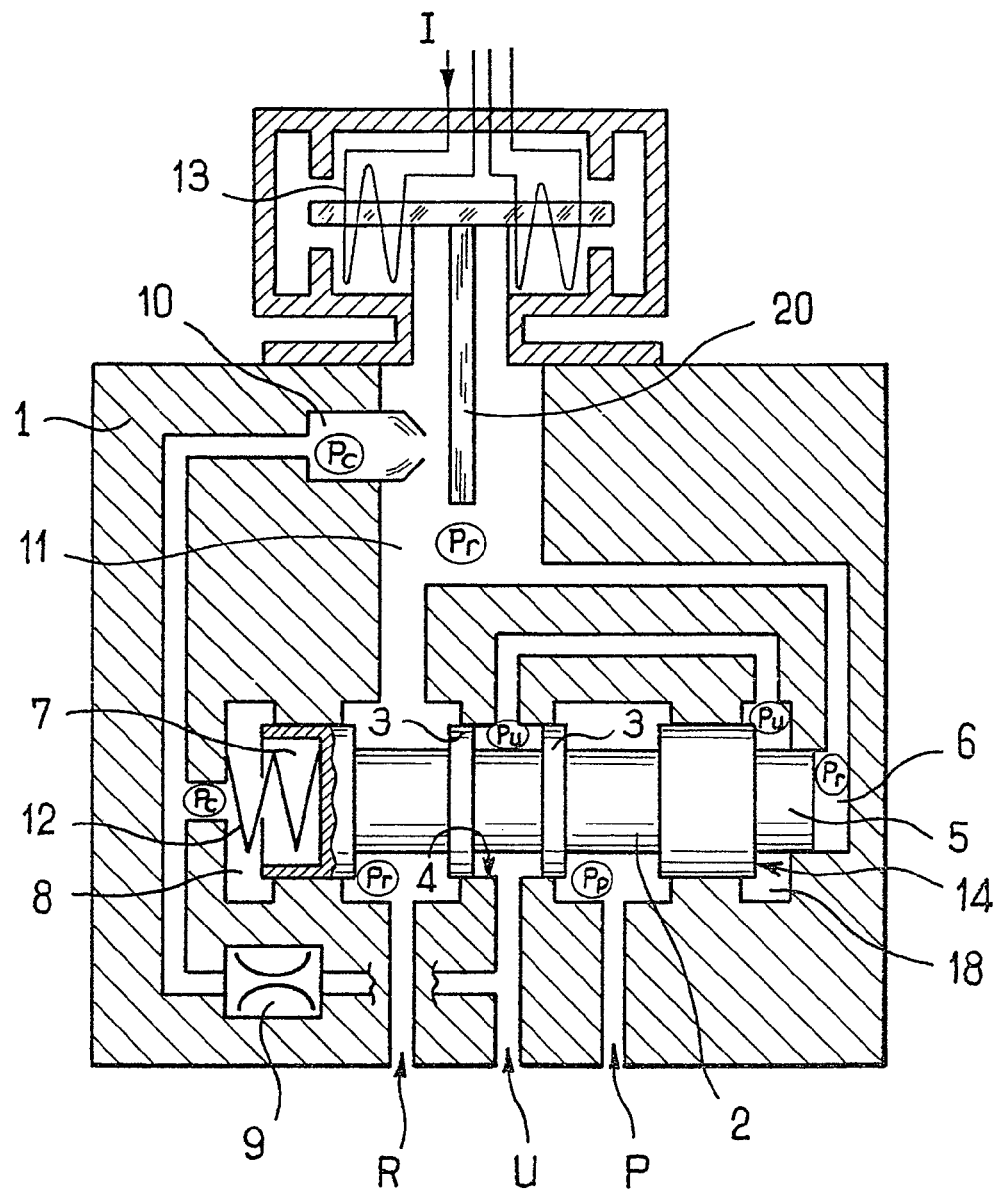

PRESSURE-REGULATOR SERVOVALVE WITH REDUCED LEAKAGE RATE

BACKGROUND OF THE INVENTION

This type of servovalve is used, for example, to control the hydraulic vehicle brakes, in particular the brakes of airplanes.

Pressure-regulator servovalves are known that comprise a body presenting a utilization port, a pressure feed port, and a return port, together with a distributor spool mounted to move in the body in such a manner as to put the utilization port into communication either with the pressure feed port or with the return port. The ends of the spool co-operate with the body to define two pilot chambers connected to nozzles which are arranged facing each other so as to open out into a cavity connected to the return port. A vane extending in the cavity between the nozzles is mounted to be moved in controlled manner. The pilot chambers are connected via constrictions to the pressure feed port.

Causing the vane to change position between the nozzles enables the pressures that exist in the pilot chambers to be modulated, and thus enables the spool to be moved in order to modulate the utilization pressure.

That type of servovalve has the drawback of presenting a high rate of leakage. Hydraulic fluid flows permanently through the nozzles and is returned via the return port.

That leakage makes it necessary to dimension the hydraulic fluid tanks accordingly so as to guarantee that the vehicle can be braked even in the event of a breakdown in hydraulic pressure generation.

OBJECT OF THE INVENTION

An object of the invention is to provide a pressure-regulator servovalve with reduced leakage rate.

BRIEF DESCRIPTION OF THE INVENTION

In order to achieve this object, the invention provides a pressure-regulator servovalve comprising a body having a utilization port, a pressure feed port, and a return port, a distributor spool movably mounted in the body to put the utilization port into communication either with the feed port or with the return port, the spool co-operating with the body to define at least one pilot chamber connected to a nozzle that is arranged to open out into a cavity connected to the return port, a vane extending in the cavity facing the nozzle and being mounted to be moved in controlled manner, wherein the pilot chamber is connected to the utilization port.

The utilization port is usually at a pressure that is lower than the feed pressure. By connecting the pilot chamber to the utilization port in accordance with the invention, the pressure that exists on average in the pilot chamber is reduced, thereby leading to a corresponding reduction in the leakage rate through the nozzle.

In a particular aspect of the invention, the servo-valve has only one pilot chamber and only one nozzle.

Using only one nozzle serves to reduce the leakage rate even further.

BRIEF DESCRIPTION OF THE DRAWINGS

The invention will be better understood in the light of the following description given with reference to the sole FIGURE of the accompanying drawing which is a diagrammatic section of a servovalve of the invention.

DETAILED DESCRIPTION OF THE INVENTION

With reference to the FIGURE, the pressure regulator servovalve of the invention comprises a body 1 having a pressure feed port P for connection to a source of hydraulic fluid under pressure, a return port R for connection to a circuit for returning fluid to a tank (not shown), and a utilization port U for connection to a piece of equipment, for example the hydraulic cavity in an airplane brake (not shown).

A distributor spool 2 is slidably mounted in a calibrated orifice of the body 1. The spool 2 has bearing surfaces 3 that co-operate via small clearance with a central portion 4 of the calibrated orifice, which portion extends both between the utilization port U and the return port R, and also between the utilization port U and the pressure feed port P.

Because of the sliding clearance between the bearing surfaces 3 and the central portion 4 of the calibrated orifice, there remain passages putting the utilization port U into communication with the return port R and the pressure port P. In the position shown, the passages that remain between each of the bearing surfaces 3 and the central portion 4 of the calibrated orifice are equal, so the utilization pressure Pu is equal to the mean of the return pressure Pr and the feed pressure Pp.

When the spool moves, one of the passages increases while the other decreases, such that the utilization pressure takes as its value a mean that is weighted by the flow sections for the return pressure and the feed pressure. Moving the spool thus enables the utilization pressure Pu to be adjusted to a value situated between the return pressure Pr and the feed pressure Pp.

The spool 2 has a first end 5 which co-operates with the body 1 to define a chamber 6 that is connected to the return port R and in which there exists the return pressure Pr that is applied to the first end 5.

The spool 2 has a second end 7 which co-operates with the body 1 to define a pilot chamber 8 which is connected to the utilization port U via a constriction 9 and in which there exists a control pressure Pc which is applied to the second end 7.

The pilot chamber 8 is also connected to a nozzle 10 that opens out into a cavity 11 in the body 1 that is connected to the return port R, and in which there exists the return pressure Pr. In the cavity 11, and facing the nozzle 10, there is a movable vane 20 that is actuated by an electric torque motor 13 (fed with electric current I) to move towards or away from the nozzle 10. Moving the vane 20 in front of the nozzle 10 makes it possible, at will, to modulate the control pressure Pc that exists in the nozzle 10 (and thus in the pilot chamber 8) between the return pressure and the utilization pressure.

In addition, a spring 12 is arranged in the pilot chamber 8 to act on the spool 2.

Finally, feedback relating to the utilization pressure Pu is organized by causing said pressure to act in a feedback chamber 18 defined between the body 1 and the spool 2, such that the utilization pressure Pu acts on an annular section 14 of the spool 2 against the action of the spring 12 and the action of the control pressure Pc on the second end 7 of the spool 2.

The spool 2 thus finds equilibrium between the action of the spring 12, the action of the control pressure Pc on the second end 7, the action of the utilization pressure Pu on the annular section 14, and finally the action of the return pressure Pr on the first end 5.

Connecting the nozzle 10 to the utilization port U instead of to the pressure feed port P limits the rate of leakage through the nozzle insofar as the utilization pressure Pu is nearly always lower than the feed pressure $P_p$. In particular, when the actuator connected to the utilization port U is not under load (as is the usual situation for an airplane brake), this pressure is slightly greater than the return pressure Pr, so there is little or practically no flow through the nozzle. Leakage is thus practically zero.

The use of a single nozzle makes it possible to reduce the leakage rate even further.

Experiments have been performed that show that the servovalve shown herein presents a relationship between control current I for the torque motor 13 actuating the vane 20 and the utilization pressure Pu that is remarkably linear.

The invention is not limited to the above description, but on the contrary covers any variant coming within the ambit defined by the claims.

In particular, although the servovalve shown has only one pilot chamber, the servovalve of the invention could have two pilot chambers each connected to a respective nozzle, providing at least one of the pilot chambers is connected to the utilization port.

What is claimed is:

1. A pressure-regulator servo-valve for delivering an adjusted utilization pressure to a hydraulic receiver, such as a hydraulic brake, said pressure regulator comprising:
    a body having:
        a utilization port through which said adjusted utilization pressure is transmitted to said hydraulic receiver,
        a pressure feed port through which said servo-valve is fed with pressurized fluid,
        a return port through which excess fluid is returned and,
        a calibrated orifice for receiving a slidable spool,
    wherein said spool is movably mounted in the calibrated orifice so that a position of said spool determines said adjusted utilization pressure,
    wherein said position of said spool is affected by a control pressure of fluid flowing into a pilot chamber defined in said body, said pilot chamber being permanently connected to:
        a nozzle opening out into a cavity connected to said return port, and
        said utilization port so that said pilot chamber is fed by said utilization port,
    said pressure regulator servo-valve further comprising a vane facing said nozzle and being selectively movable for modulating said control pressure into said pilot chamber.

2. The pressure regulator servo-valve according to claim 1, wherein said servo-valve has only one nozzle.

3. The pressure regulator servo-valve according to claim 1, wherein said pilot chamber is connected to said utilization port via a constriction.

* * * * *